United States Patent [19]
Aoyama et al.

[11] Patent Number: 5,622,048
[45] Date of Patent: Apr. 22, 1997

[54] CATALYST DETERIORATION RECOVERY DEVICE

[75] Inventors: Takashi Aoyama, Zushi; Tadaki Oota, Fujisawa, both of Japan

[73] Assignee: Nissan Motor Co., Ltd., Yokohama, Japan

[21] Appl. No.: 403,661

[22] Filed: Mar. 14, 1995

[30] Foreign Application Priority Data

Mar. 14, 1994 [JP] Japan .................................. 6-042794

[51] Int. Cl.$^6$ ...................................... F01N 3/20
[52] U.S. Cl. ......................................... 60/277; 60/285
[58] Field of Search .............................. 60/274, 277, 285

[56] References Cited

U.S. PATENT DOCUMENTS 5,398,501  3/1995  Leo et al. .................................. 60/277

FOREIGN PATENT DOCUMENTS 63-128221  8/1988  Japan .

*Primary Examiner*—Leonard E. Heyman
*Attorney, Agent, or Firm*—Foley & Lardner

[57] ABSTRACT

To restore the efficiency of a platinum catalyst used for engine exhaust purification that has temporarily deteriorated through oxidation, the stoichiometric air-fuel ratio, or an air-fuel ratio set to a richer value than the stoichiometric air-fuel ratio of the air-fuel mixture supplied to the engine, is applied. The engine running condition and a decrease of catalyst oxidation are detected, and a recovery treatment temperature depending on the degree of oxidation is set. An engine running condition range suited to performing recovery treatment is set based on this recovery treatment temperature. By determining whether or not the running condition is within this range and applying a recovery treatment air-fuel ratio, recovery treatment is performed only under conditions satisfying the recovery treatment temperature. Recovery treatment is therefore performed efficiently, while increase of fuel costs and worsening of exhaust gas composition due to recovery treatment at low temperature are kept to a minimum.

11 Claims, 16 Drawing Sheets

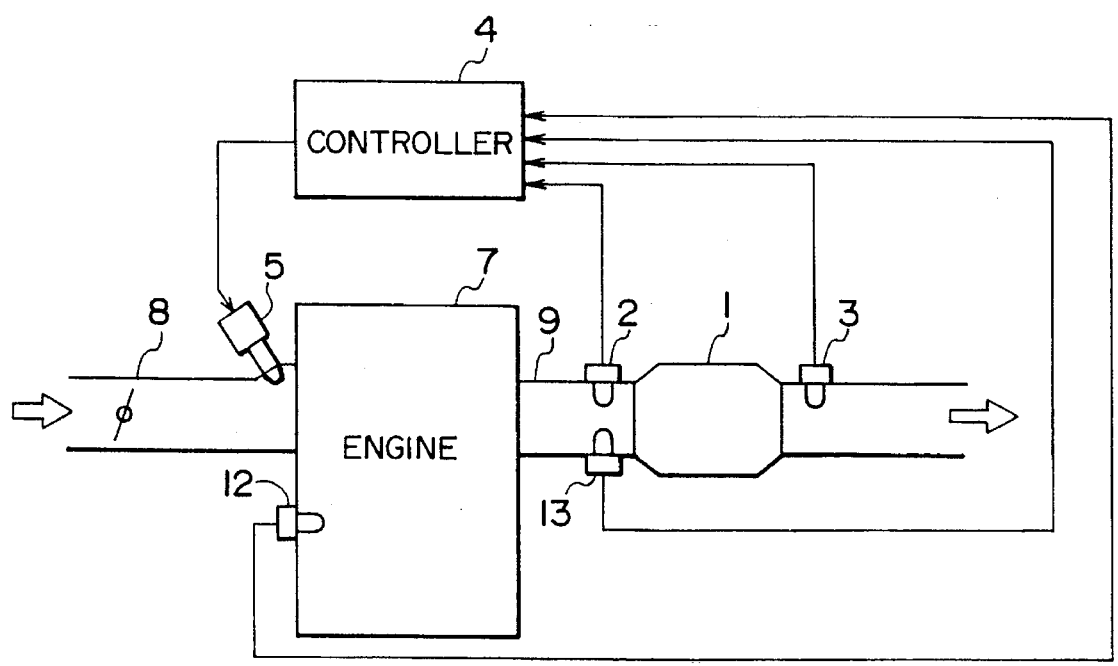
F I G. 1

| INVERSION FREQUENCY RATIO | $Fr$ | $Fr_1$ | $Fr_2$ | | $Fr_x$ |
|---|---|---|---|---|---|
| CATALYST OXIDATION DEGREE | $Rm$ | $Rm_1$ | $Rm_2$ | | $Rm_x$ |
| RECOVERY TREATMENT TEMPERATURE | $Ta$ | $Ta_1$ | $Ta_2$ | | $Ta_x$ |

RECOVERY TREATMENT
REGION

| $Tr_{1n}$ | $Tr_{2n}$ | | | | | | | | $Tr_{mn}$ |
|---|---|---|---|---|---|---|---|---|---|
| | | | | | | | | | |
| | | | | | | | | | |
| | | | | | | | | | |
| | | | | | | | | | |
| $Tr_{12}$ | $Tr_{22}$ | | | | | | | | $Tr_{m2}$ |
| $Tr_{11}$ | $Tr_{21}$ | | | | | | | | $Tr_{m1}$ |

RECOVERY TREATMENT
REGION

| $Khs_{1n}$ | $Khs_{2n}$ | | | | | | | | $Khs_{mn}$ |
|---|---|---|---|---|---|---|---|---|---|
| | | | | | | | | | |
| | | | | | | | | | |
| | | | | | | | | | |
| | | | | | | | | | |
| $Khs_{12}$ | $Khs_{22}$ | | | | | | | | $Khs_{m2}$ |
| $Khs_{11}$ | $Khs_{21}$ | | | | | | | | $Khs_{m1}$ |

RECOVERY TREATMENT REGION

| $Kca_{1n}$ | $Kca_{2n}$ | | | | | | | | $Kca_{mn}$ |
|---|---|---|---|---|---|---|---|---|---|
| | | | | | | | | | |
| | | | | | | | | | |
| | | | | | | | | | |
| | | | | | | | | | |
| $Kca_{12}$ | $Kca_{22}$ | | | | | | | | $Kca_{m2}$ |
| $Kca_{11}$ | $Kca_{21}$ | | | | | | | | $Kca_{m1}$ |

N (vertical axis), Tp (horizontal axis)

FIG. 16

RECOVERY TREATMENT REGION

| $Tia_{1n}$ | $Tia_{2n}$ | | | | | | | | $Tia_{mn}$ |
|---|---|---|---|---|---|---|---|---|---|
| | | | | | | | | | |
| | | | | | | | | | |
| | | | | | | | | | |
| | | | | | | | | | |
| $Tia_{12}$ | $Tia_{22}$ | | | | | | | | $Tia_{m2}$ |
| $Tia_{11}$ | $Tia_{21}$ | | | | | | | | $Tia_{m1}$ |

N (vertical axis), Tp (horizontal axis)

FIG. 17

RECOVERY TREATMENT REGION

| $Trr_{1n}$ | $rr_{2n}$ |  |  |  |  |  |  |  | $Trr_{mn}$ |
|---|---|---|---|---|---|---|---|---|---|
|  |  |  |  |  |  |  |  |  |  |
|  |  |  |  |  |  |  |  |  |  |
|  |  |  |  |  |  |  |  |  |  |
|  |  |  |  |  |  |  |  |  |  |
| $Trr_{12}$ | $Trr_{22}$ |  |  |  |  |  |  |  | $Trr_{m2}$ |
| $Trr_{11}$ | $Trr_{21}$ |  |  |  |  |  |  |  | $Trr_{m1}$ |

RECOVERY TREATMENT REGION

| $KMRr_{1n}$ | $KMRr_{2n}$ |  |  |  |  |  |  |  | $KMRr_{mn}$ |
|---|---|---|---|---|---|---|---|---|---|
|  |  |  |  |  |  |  |  |  |  |
|  |  |  |  |  |  |  |  |  |  |
|  |  |  |  |  |  |  |  |  |  |
|  |  |  |  |  |  |  |  |  |  |
| $KMRr_{12}$ | $KMRr_{22}$ |  |  |  |  |  |  |  | $KMRr_{m2}$ |
| $KMRr_{11}$ | $KMRr_{21}$ |  |  |  |  |  |  |  | $KMRr_{m1}$ |

CATALYST DETERIORATION RECOVERY DEVICE

FIELD OF THE INVENTION

This invention relates to a mechanism for restoring a deteriorated platinum catalyst used in a three-way catalytic converter for an engine.

BACKGROUND OF THE INVENTION

In an automobile engine, to purify the exhaust gas, the air-fuel ratio is usually controlled to a stoichiometric air-fuel ratio, and a three-way catalytic converter that simultaneously oxidizes HC, CO and reduces NOx is often installed in the exhaust pipe.

In such a catalytic converter, a platinum type catalyst having platinum as its principal component is used. At the high temperature of the exhaust gas, platinum oxidizes when the air-fuel ratio is leaner than the stoichiometric air-fuel ratio, and the catalyst performance temporarily decreases as a result. This temporary deterioration progresses under high temperature, lean conditions, but the catalyst is restored when, at high temperature, the air-fuel ratio reverts to a stoichiometric or rich condition.

in this context, Jikkai Sho 63-128221 published in 1988 by the Japanese Patent Office for example discloses a mechanism that restores a platinum type catalyst by making the air-fuel ratio rich when catalyst oxidation reaches a certain level.

However, recovery of the platinum catalyst requires not only a rich air-fuel ratio, but also a high temperature, and if the temperature falls during the recovery process, recovery of the catalyst is delayed. In this mechanism, catalyst recovery also takes place under running conditions when exhaust temperature is low such as when the engine is running on low load. This causes catalyst recovery to be delayed, and if the engine continues to run at a rich air-fuel ratio at low temperature for a long time, it increases fuel consumption and worsens the exhaust gas composition.

SUMMARY OF THE INVENTION

It is therefore an object of this invention to effectively restore a platinum catalyst whose efficiency has temporarily deteriorated through oxidation.

It is a further object of this invention to prevent rich running conditions from continuing after an oxidized platinum catalyst has been restored.

It is yet a further object of this invention to control an engine such that the recovery of a platinum catalyst does not put an excessive thermal load on the engine.

In order to achieve the above objects, this invention provides a device for causing a platinum catalyst used in the exhaust purification system of an engine to recover from oxidation by regulating an air-fuel mixture supplied to the engine so as to have a recovery treatment air-fuel ratio equal to or richer than a stoichiometric air-fuel ratio.

The device comprises a mechanism for detecting an engine running condition, a mechanism for detecting a degree of oxidation $R_m$ of the catalyst, a mechanism for setting a recovery treatment temperature Ta according to the degree of oxidation $R_m$, a mechanism for setting a range of the engine running condition wherein the recovery treatment air-fuel ratio is applied, and a mechanism for applying the recovery treatment air-fuel ratio when the engine running condition is within the recovery treatment range.

The range setting mechanism comprises, for example, a mechanism for setting a recovery treatment temperature Ta according to the degree of oxidation $R_m$ and a mechanism for setting the recovery treatment range based on this temperature Ta.

The engine running condition comprises, for example, an engine running speed N and a basic fuel injection amount Tp determined according to an engine air intake volume.

According to an aspect of this invention, the range setting mechanism comprises a mechanism for storing a first reference temperature Ts corresponding to an engine exhaust temperature for an air-fuel mixture having the stoichiometric air-fuel ratio, and a mechanism for defining the running condition, in which the first reference temperature Ts exceeds the recovery treatment temperature Ta, as the recovery treatment range, and the recovery treatment air-fuel ratio applying mechanism comprises a mechanism for correcting the air-fuel ratio to a rich air-fuel ratio by which the first reference temperature Ts decreases to the recovery treatment temperature Ta.

In this case, it is preferable that the engine comprises a mechanism for controlling the air-fuel ratio to a rich air-fuel ratio by an air-fuel ratio correction coefficient KMRs determined according to the running condition, that the range setting mechanism comprises a mechanism for storing a second reference temperature Tr corresponding to the exhaust temperature at the rich air-fuel ratio, and that the recovery treatment air-fuel ratio applying mechanism comprises a mechanism for computing an air-fuel ratio correction coefficient Khs for making the first reference temperature Ts equal to the recovery treatment temperature Ta, the coefficient Khs being computed from the first reference temperature Ts, the second reference temperature Tr and the air-fuel ratio correction coefficient KMRs, a mechanism for computing a recovery treatment air-fuel ratio using the coefficient Khs, a mechanism for computing a total time Tim from when the recovery treatment air-fuel ratio is applied, and a mechanism for stopping application of the recovery treatment air-fuel ratio when the time Tim exceeds a predetermined value Tc.

According to another aspect of this invention, the recovery treatment air-fuel ratio is set to the stoichiometric air-fuel ratio. The range setting mechanism comprises a mechanism for storing a first reference temperature Ts corresponding to the exhaust temperature for an air-fuel mixture having the stoichiometric air-fuel ratio, and a mechanism for defining the running condition, in which the first reference temperature Ts exceeds the recovery treatment temperature Ta, as the recovery treatment range, and the recovery treatment air-fuel ratio applying mechanism comprises a mechanism for computing a coefficient Kca of a recovery rate corresponding to the first reference temperature Ts and a recovery rate corresponding to the recovery treatment temperature Ta, a mechanism for counting a time interval Ti for computing the coefficient Kca, a mechanism for computing a product of the time interval Ti and the coefficient Kca, a mechanism for accumulating this product, and a mechanism for stopping application of the recovery treatment air-fuel ratio when a value Tim accumulated by the accumulating mechanism has reached a predetermined value Tc.

According to yet another aspect of this invention, the recovery treatment air-fuel ratio is set to a value richer than the stoichiometric air-fuel ratio. The range setting mechanism comprises a mechanism for storing a target temperature Trr corresponding to the exhaust temperature for an air-fuel mixture having the recovery treatment air-fuel ratio and a mechanism for defining the running condition, in which the target temperature Trr exceeds the recovery treatment temperature Ta, as the recovery treatment range, and the recovery treatment air-fuel ratio applying mechanism comprises a mechanism for computing a coefficient Kca of a recovery rate corresponding to the target temperature Trr and a recovery rate corresponding to the recovery treatment temperature Ta, a mechanism for measuring a time interval Ti for computing the coefficient Kca, a mechanism for computing a product of the time interval Ti and the coefficient Kca, a mechanism for accumulating this product, and a mechanism for stopping application of the recovery treatment air-fuel ratio when a value Tim accumulated by the accumulating mechanism has reached a predetermined value Tc.

It is preferable that the device further comprises a mechanism for learning and correcting the recovery treatment temperature Ta based on the degree of oxidation $R_m$ detected immediately after terminating application of the recovery treatment air-fuel ratio.

It is also preferable that the device further comprises a mechanism for prohibiting stoppage of fuel supply during application of the recovery treatment air-fuel ratio even when the engine is decelerating.

The details as well as other features and advantages of this invention are set forth in the remainder of the specification and are shown in the accompanying drawings.

BRIEF DESCRIPTION OF THE DRAWINGS

FIG. 1 is a schematic diagram of a catalyst restoring mechanism according to this invention.

FIG. 10 is a table showing a second reference temperature according to this invention.

FIG. 11 is a table showing an air-fuel ratio correction coefficient Khs according to this invention.

FIG. 16 is a table showing a weighting coefficient according to the second embodiment of this invention.

FIG. 17 is a table showing a running permission time according to the second embodiment of this invention.

FIG. 20 is a table showing a second reference exhaust temperature Tr according to the third embodiment of this invention.

FIG. 21 is a table showing an air-fuel ratio correction coefficient KMRr according to the third embodiment of this invention.

DETAILED DESCRIPTION OF THE PREFERRED EMBODIMENTS

Figure 2:
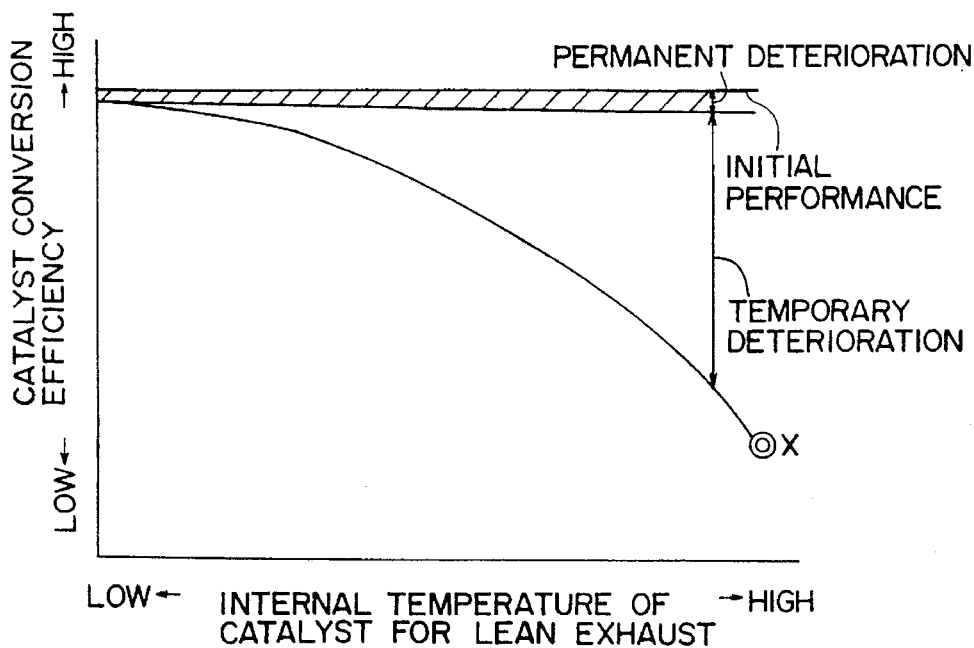
FIG. 2 is a graph showing a relation between temporary deterioration of catalyst efficiency under lean conditions and a catalyst temperature according to this invention.

Referring to FIG. 1 of the drawings, an engine 7 is prodded with an intake passage 8 and exhaust passage 9. A fuel injection valve 5 for injecting fuel according to a fuel injection signal from a controller 4 is installed in the intake passage 8.

A three-way catalytic converter 1 that simultaneously oxidizes HC, CO and reduces NOx is installed in the exhaust passage 9. The main component used by the three-way catalytic converter 1 is a platinum based catalyst.

A first oxygen sensor 2 and second oxygen sensor 3 are installed respectively upstream and downstream of the catalytic converter 1.

In order that the catalytic converter 1 functions efficiently, and that the simultaneous oxidation of HC, CO and reduction of NOx in the exhaust proceed efficiently, it is essential that the air-fuel ratio of the air-fuel mixture supplied to the engine 7 be controlled to within a narrow range centered on the stoichiometric air-fuel ratio.

To perform this control, sensors for detecting the running conditions of the engine 7, such as an engine intake volume detecting sensor or an engine speed detecting sensor, not shown, are fitted to the engine 7. The signals emitted by these sensors are input, together with the signals from the first and second oxygen sensors 2, 3, to the controller 4.

Based on the detected engine air intake amount and engine speed, the controller 4 computes a basic fuel injection amount Tp so as to cause the air-fuel ratio to approach the stoichiometric air-fuel ratio. The fuel injection amount is also feedback-controlled, based on the real air-fuel ratio signal detected by the first oxygen sensor 2, so that the real air-fuel ratio lies within the stoichiometric air-fuel ratio range.

Under a predetermined high load, the controller 4 performs open control such that the air-fuel ratio is richer than the stoichiometric air-fuel ratio. An air-fuel ratio correction coefficient KMRs is used for this correction. By controlling the air-fuel ratio of the air-fuel mixture supplied to the engine 7 so that it is richer than the stoichiometric air-fuel ratio by a predetermined amount, engine power is improved, and excessive rise of the exhaust temperature, i.e. catalyst temperature, is thereby prevented.

The controller 4 also stops supply of fuel to the fuel injection valve 5 under predetermined conditions when the vehicle is decelerating. Hence, by cutting the fuel supply under conditions when fuel injection is not needed, fuel costs are decreased and noxious components of the exhaust are reduced.

The above fuel control by the controller 4 is known in the art.

However, in general, the conversion efficiency of a three-way catalytic converter tends to deteriorate due to oxidation of the catalyst metal in high temperature exhaust when the air-fuel ratio is leaner than the stoichiometric air-fuel ratio. This phenomenon is known as temporary deterioration of the catalyst efficiency, whereas deterioration of the catalyst efficiency due to physical reasons is known as permanent deterioration.

FIG. 2 shows a relation between conversion efficiency and catalyst internal temperature after the catalytic converter 1 has been exposed to lean exhaust for a certain time.

According to this graph, the proportion of permanent deterioration in the decrease of conversion efficiency is substantially constant regardless of the catalyst temperature, most of the deterioration being temporary deterioration. It is seen that this temporary deterioration proceeds rapidly in high temperature exhaust.

Figure 3:
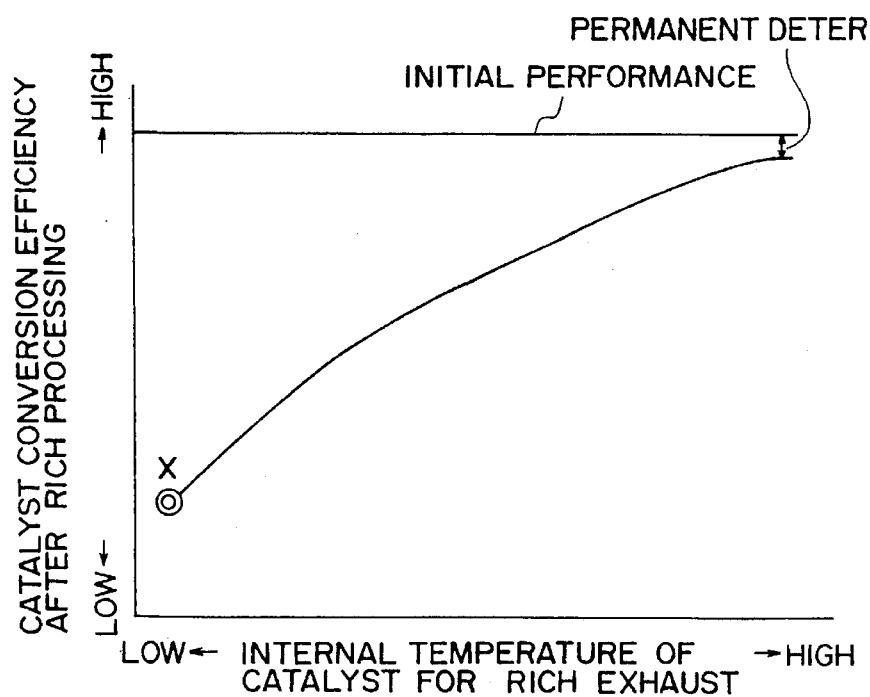
FIG. 3 is a graph showing a relation between a recovery state under rich conditions of the catalyst whose efficiency has been temporarily deteriorated through oxidation, and the catalyst temperature according to this invention.

FIG. 3 shows a relation between catalyst internal temperature and conversion efficiency of the catalytic converter 1 when the catalyst represented by a point X in FIG. 3 is exposed to rich exhaust. It is seen that the higher the catalyst temperature during rich treatment, the higher the recovery rate from temporary deterioration. It is also seen that, apart from permanent deterioration, the conversion efficiency of the catalytic converter 1 effectively recovers completely in high temperature, rich exhaust.

This invention concerns the recovery characteristics of the aforesaid catalyst from deterioration due to oxidation.

According to this invention, the controller 4 compares the number of times the output signal of the first oxygen sensor 2 inverts between rich and lean, with the number of times the output signal of the second oxygen sensor 3 inverts between rich and lean, and thereby detects the degree of oxidation $R_m$ of the catalyst.

The controller 4 executes recovery treatment of the catalyst 1 corresponding to its degree of oxidation when a predetermined exhaust temperature has been reached. For this purpose, signals from a water temperature sensor 12 that detects the temperature of engine cooling water, and from a temperature sensor 13 that detects the exhaust temperature on the inlet side of the catalytic converter 1, are input to the controller 4.

Figure 4:
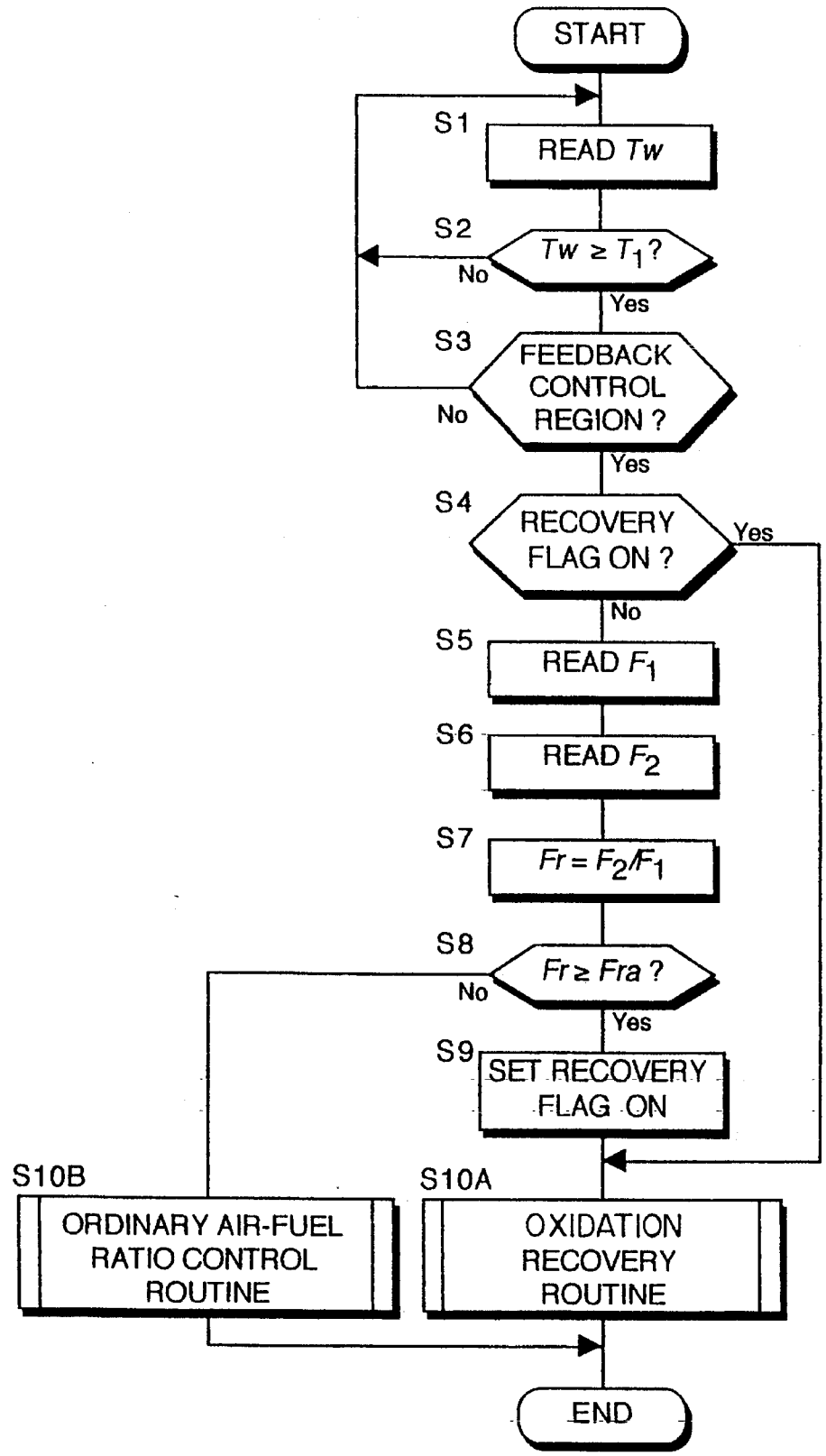
FIG. 4 is a flowchart showing a catalyst oxidation determining process according to this invention.

Based on these input signals, the controller 4 executes a routine for detecting the degree of oxidation $R_m$ of the catalyst as shown in FIG. 4.

First, in step S1, an engine cooling water temperature Tw is read. In step S2, it is determined whether or not the engine cooling water temperature Tw is equal to or greater than a predetermined temperature $T_1$, and in step S3 it is determined whether or not the engine running conditions are within the feedback control region of the air-fuel ratio. As the predetermined temperature $T_1$, the temperature after the engine has warmed up may, for example, be used.

In step S4, it is determined if a recovery flag is ON. The recovery flag shows if a recovery of the catalyst is required. All flags including the recovery flag are initially set OFF.

In steps S5 and S6, an inversion frequency $F_1$ between rich and lean of the first oxygen sensor 2 installed upstream of the catalytic converter 1, and an inversion frequency $F_2$ between rich and lean of the second oxygen sensor 3 installed downstream, are read.

Figure 5:
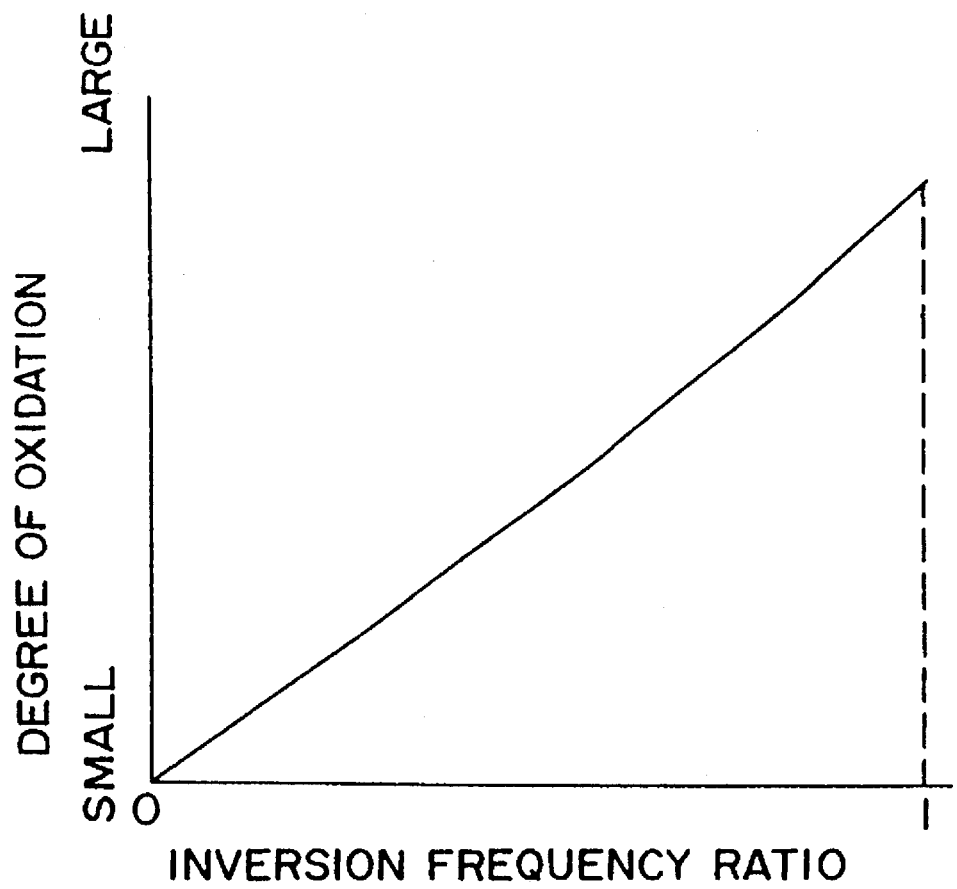
FIG. 5 is a graph showing a relation between a catalyst oxidation degree Rm and an inversion frequency ratio Fr according to this invention.

As the ratio of inversion frequencies, $F_2/F_1$ approaches 1 the more the catalyst is oxidized, as shown in FIG. 5. When the catalytic converter 1 is functioning normally, the oxygen in the exhaust is stored in it, so the oxygen in the upstream exhaust cannot be detected downstream of the catalytic converter 1. However, when the catalyst has oxidized, upstream oxygen does flow downstream, so the inversion frequency $F_2$ output by the downstream oxygen sensor 3 approaches the inversion frequency $F_1$ output by the upstream oxygen sensor 2.

In step S7, an inversion frequency ratio $Fr=F_2/F_1$ is computed, and in step S8, the inversion frequency ratio Fr is compared with a predetermined value Fra. When the inversion frequency ratio Fr is equal to or greater than the predetermined value Fra, it indicates that catalyst oxidation has progressed. In this case, the recovery flag is set ON in step S9 and the program proceeds to the oxidation recovery routine in a step S10A.

When the inversion frequency ratio Fr is less than the predetermined value Fra, the program proceeds to step S10B and returns to the ordinary air-fuel ratio control routine. This routine is part of the prior art as mentioned previously.

Next, the deterioration recovery routine will be described with reference to FIG. 7 and FIG. 8.

In step S11, fuel cut control is prohibited during deceleration. By prohibiting fuel cut during catalyst recovery, the catalyst is prevented from being exposed to high temperature, lean conditions, and progression of temporary deterioration is thereby prevented.

Figures 6, 9:
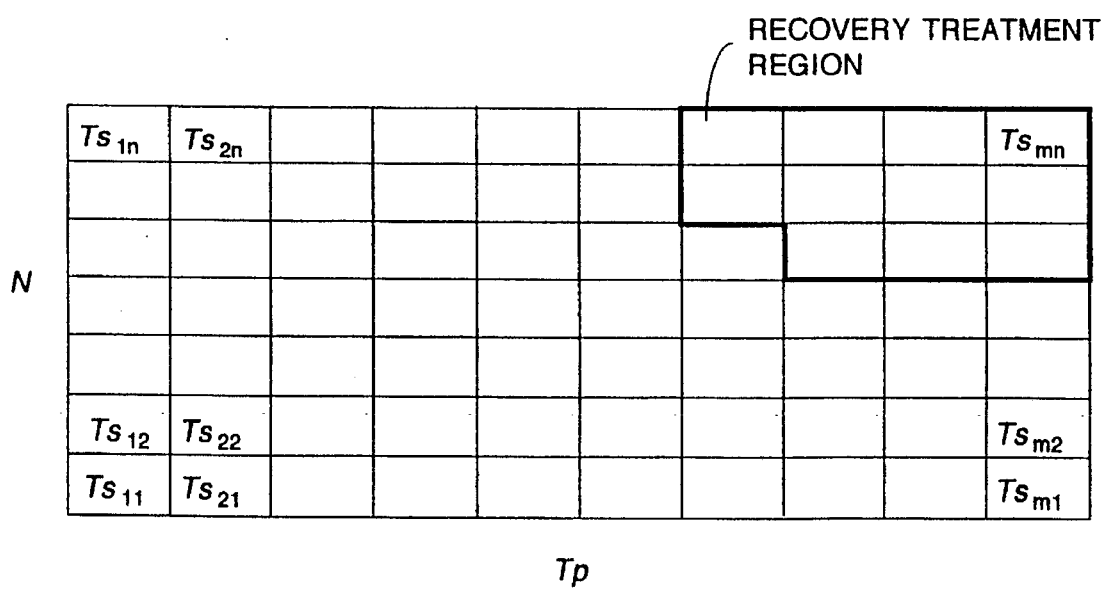
FIG. 6 is a table specifying the relations between the inversion frequency ratio Fr, the oxidation degree $R_m$, and an oxidation recovery temperature Ta, according to this invention.
FIG. 9 is a table showing a first reference temperature according to this invention.

In steps S12, S13, the catalyst oxidation degree $R_m$ and a recovery treatment temperature Ta are read from a table shown in FIG. 6 based on the inversion frequency Fr. These values are set stepwise according to the inversion frequency ratio Fr. The recovery temperature Ta is set higher the greater the degree of oxidation $R_m$, and is set so that catalyst recovery can be efficiently completed within about the same time regardless of the degree of oxidation $R_m$. However, the recovery temperature Ta is set within such a range that there is no adverse effect on heat resistance of the catalyst, etc., even if the engine is running continuously.

In step S14, a first reference exhaust temperature Ts set according to an engine running speed N and basic fuel injection amount Tp is searched from the table in FIG. 9, and a recovery region satisfying the condition Ts≧Ta is then set. The first reference exhaust temperature Ts is the exhaust temperature under running conditions when the air-fuel ratio of the air-fuel mixture supplied to the engine 7 is feedback controlled.

In a step S15, a second reference exhaust temperature Tr, set according to the engine speed N and basic fuel injection amount Tp, is found from the table shown in FIG. 10. The second reference exhaust temperature Tr is the exhaust temperature under running conditions when the air-fuel ratio is open controlled to richer than the stoichiometric air-fuel ratio using the aforesaid correction coefficient KMRs so as to prevent excessive temperature rise of the catalyst, etc., on high load. The value of the air-fuel ratio correction coefficient KMRs at this time is found from a table, not shown, that is set according to the engine speed N and fuel injection amount Tp (step 16).

All the aforesaid tables are previously stored in the controller 4.

In step 17, an air-fuel ratio correction coefficient Khs is determined by the following equation:

$$Khs = \frac{Ta - Tr}{Ts - Tr} * KMRs$$

This relation determines the air-fuel ratio correction coefficient Khs required to reduce the first reference exhaust temperature Ts to the recovery temperature Ta, using the air-fuel ratio correction coefficient KMRs required to reduce the first reference exhaust temperature Ts to the second reference exhaust temperature Tr.

The program then proceeds to step S18 where it is determined if a table construction flag is ON. The table construction flag shows if a Khs table has been constructed, initial state of this flag is OFF.

In step S20, if it is determined that Ts=Tr or that Khs has assumed a negative value, the program proceeds to a step S19 where Khs is set equal to 0.

In step S21, the Khs table, a correction value table of the air-fuel ratio correction coefficient Khs according to the engine speed N and fuel injection amount Tp, is constructed as shown in FIG. 11. This table is constructed for read values of Ta each time the recovery routine is executed.

In step S22, it is determined whether or not the present running conditions are suited to the recovery region based on the table in FIG. 9.

If it is determined that the present running conditions are within the recovery region, the program proceeds to step S24, and a fuel injection amount is determined as a final KMRs obtained by subtracting Khs from KMRs corresponding to the present engine speed N and fuel injection amount Tp.

On the other hand, in steps S23 and S25, a time Tim from when the recovery region was entered is accumulated, and if the total time Tim exceeds a predetermined value Tc, the table construction flag is set OFF in step S26, and then the program shifts to a recovery temperature learning routine in step S29, and returns to normal air-fuel ratio control.

If it is determined in step S22 that the present conditions are out of the recovery region, the program stops the Tim count in step S27, sets the table construction flag ON in a step S28, returns to the routine of FIG. 4 and repeat the process from the start.

If it is determined in step 25 that Tim is less than Tc, the program also returns to the routine of FIG. 4 and repeat the process from the start.

In this way, the recovery temperature Ta is set according to the degree of oxidation $R_m$, and if the degree of oxidation $R_m$ is different, the recovery treatment is terminated in approximately the same time so that recovery treatment control does not continue longer than necessary.

According to the aforesaid control, the air-fuel ratio correction coefficient Khs is computed based on the exhaust temperature when the vehicle is running at the stoichiometric air-fuel ratio, and on the exhaust temperature when the vehicle is running at a predetermined rich air-fuel ratio obtained by applying the air-fuel ratio correction coefficient KMRs. The exhaust temperature during the recovery treatment is thereby suitably controlled.

Figure 12:
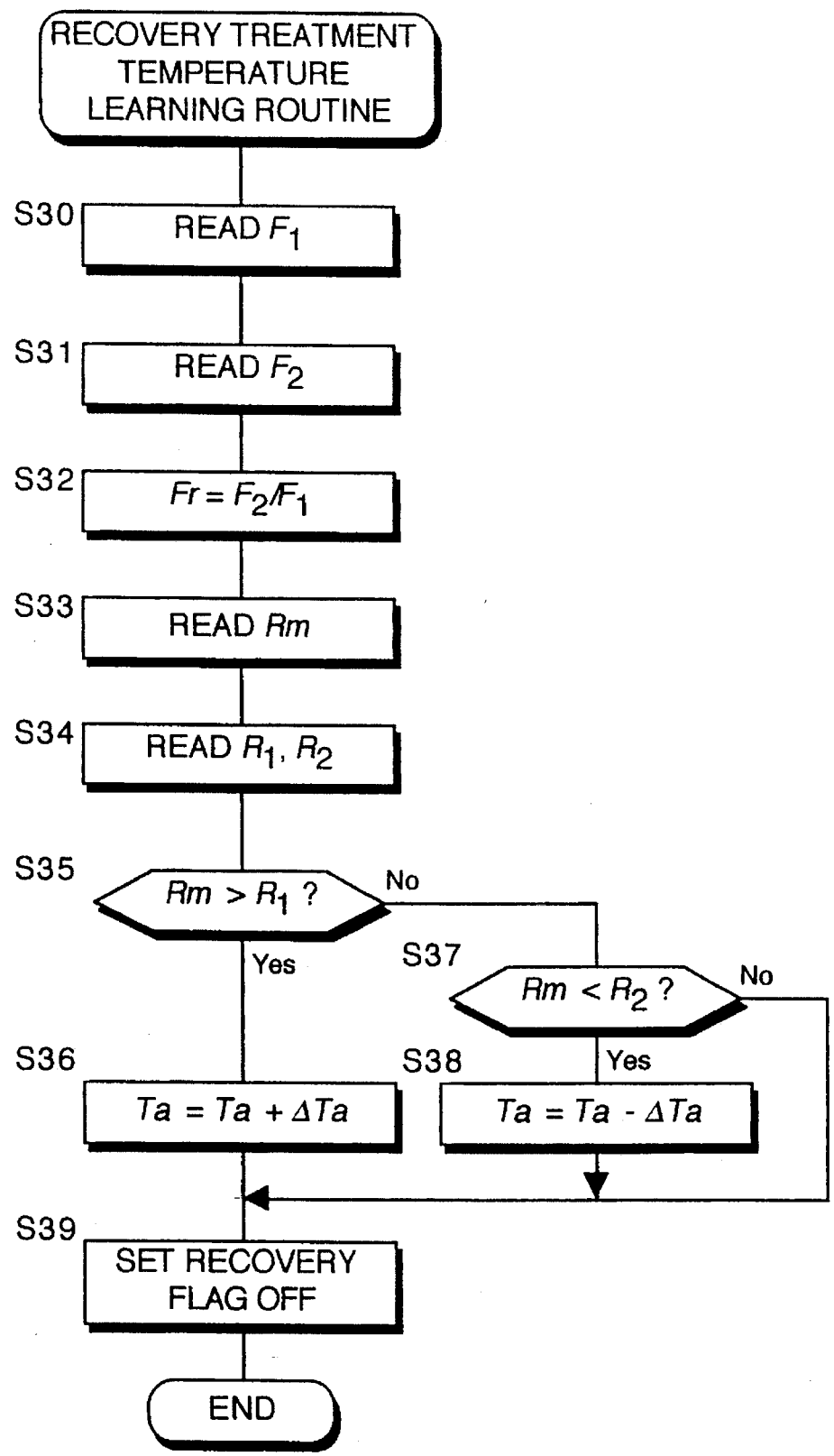
FIG. 12 is a flowchart showing an oxidation recovery temperature learning process according to this invention.

Next, the recovery treatment temperature learning routine shown in FIG. 12 will be described.

First, in steps S30, S31, the lean/rich inversion frequencies $F_1$, $F_2$ of the first oxygen sensor 2 upstream of the catalyst 1, and the second oxygen sensor 3 downstream of the catalyst 1, are read.

The program proceeds to step S32, where the inversion frequency ratio Fr is computed from $F_2/F_1$, and the program proceeds to step S33, where the catalyst oxidation degree $R_m$ corresponding to the inversion frequency Fr is searched from the table of FIG. 6.

Figure 13:
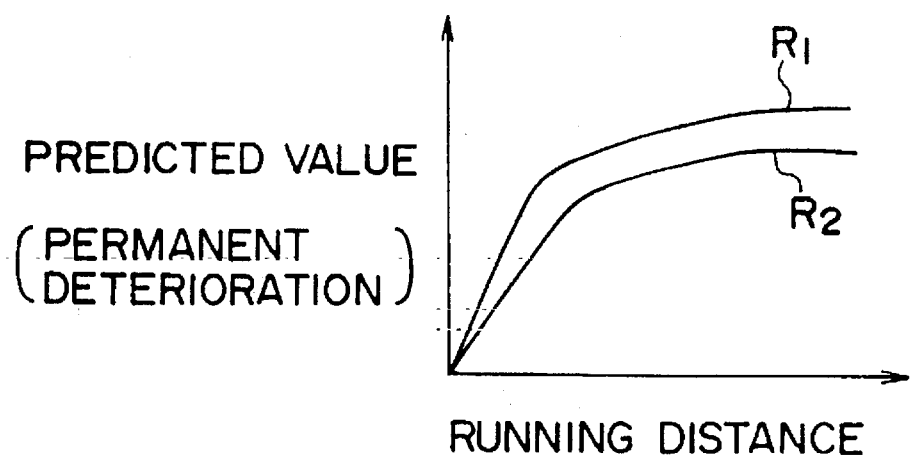
FIG. 13 is a graph of predicted values $R_1$ and $R_2$ of extent of permanent oxidation according to this invention.

In step S34, predicted values $R_1$, $R_2$ of the degree of oxidation $R_m$ are read from a table summarized in FIG. 13. The predicted values $R_1$, $R_2$ are values corresponding to the proportion of permanent deterioration in the decrease of catalyst conversion efficiency, and respectively indicate the upper and lower limits of the deterioration. These values are previously determined by experiment, are stored in the controller 4 and increase with the running distance of the vehicle.

The program proceeds to step S35, and it is determined whether or not the value $R_m$ is greater than the value $R_1$. If $R_m > R_1$, the catalyst has not yet completely recovered from temporary deterioration despite the recovery treatment performed during a predetermined time interval. In this case, the program proceeds to step S36, and the value of the recovery treatment temperature Ta in the table of FIG. 6 is updated by Ta=Ta+ΔTa. ΔTa is a previously determined fixed increase/decrease correction value. In this way, by increasing the recovery treatment temperature Ta by the correction value ΔTa, the next catalyst recovery treatment is performed earlier, and the treatment is expected to be completed within a fixed time.

On the other hand, if the deterioration determining value $R_m$ is less than the predicted value $R_1$ in step S35, it is determined that the catalyst has recovered from temporary deterioration, the program proceeds to step S37, and it is determined whether or not the deterioration determining value $R_m$ is less than the predicted value $R_2$.

If $R_m < R_2$, it is determined that the catalyst has recovered from temporary deterioration before the expiration of the predetermined time interval, and the program proceeds to step S38, where the recovery treatment temperature Ta in the table of FIG. 6 is updated by Ta=Ta−ΔTa. In this way, by decreasing the recovery treatment temperature Ta by the correction value ΔTa, the next catalyst recovery treatment is delayed, and the air-fuel ratio is not controlled to rich any more than necessary.

When $R_1 \geq R_m \geq R_2$, it is determined that the recovery treatment has terminated within the predetermined time, and Ta is not corrected.

Finally, in step S39, the recovery flag is set OFF, and the program returns to the routine of FIG. 4 to repeat the whole process.

By means of the aforesaid learning correction, the temperature required for recovery treatment is precisely controlled, and as recovery treatment of the catalyst is performed no more or less than is necessary within a fixed time period. Fuel consumption is improved, and noxious components in the exhaust is decreased.

Further, fuel cut during recovery treatment is prohibited, so temporary deterioration during recovery treatment is prevented from progressing as mentioned before, and learning correction of the recovery treatment exhaust temperature Ta is performed with high precision.

Next, a second embodiment of this invention concerning the oxidation recovery routine will be described referring to FIGS. 14–17.

According to this embodiment, instead of making the air-fuel rich and controlling the exhaust temperature to the recovery treatment temperature Ta, recovery treatment is performed at high temperature at the stoichiometric air-fuel ratio. In this case, the total recovery treatment time is controlled.

Figure 7:
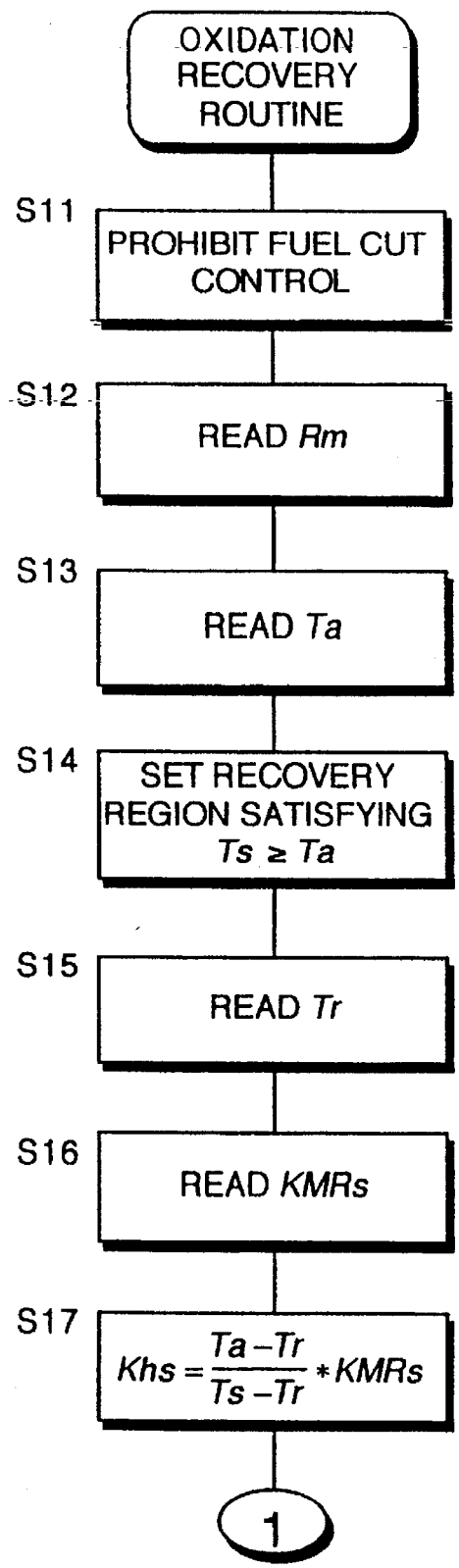
FIG. 7 is a flowchart showing a part of an oxidation recovery process according to this invention.
Figure 8:
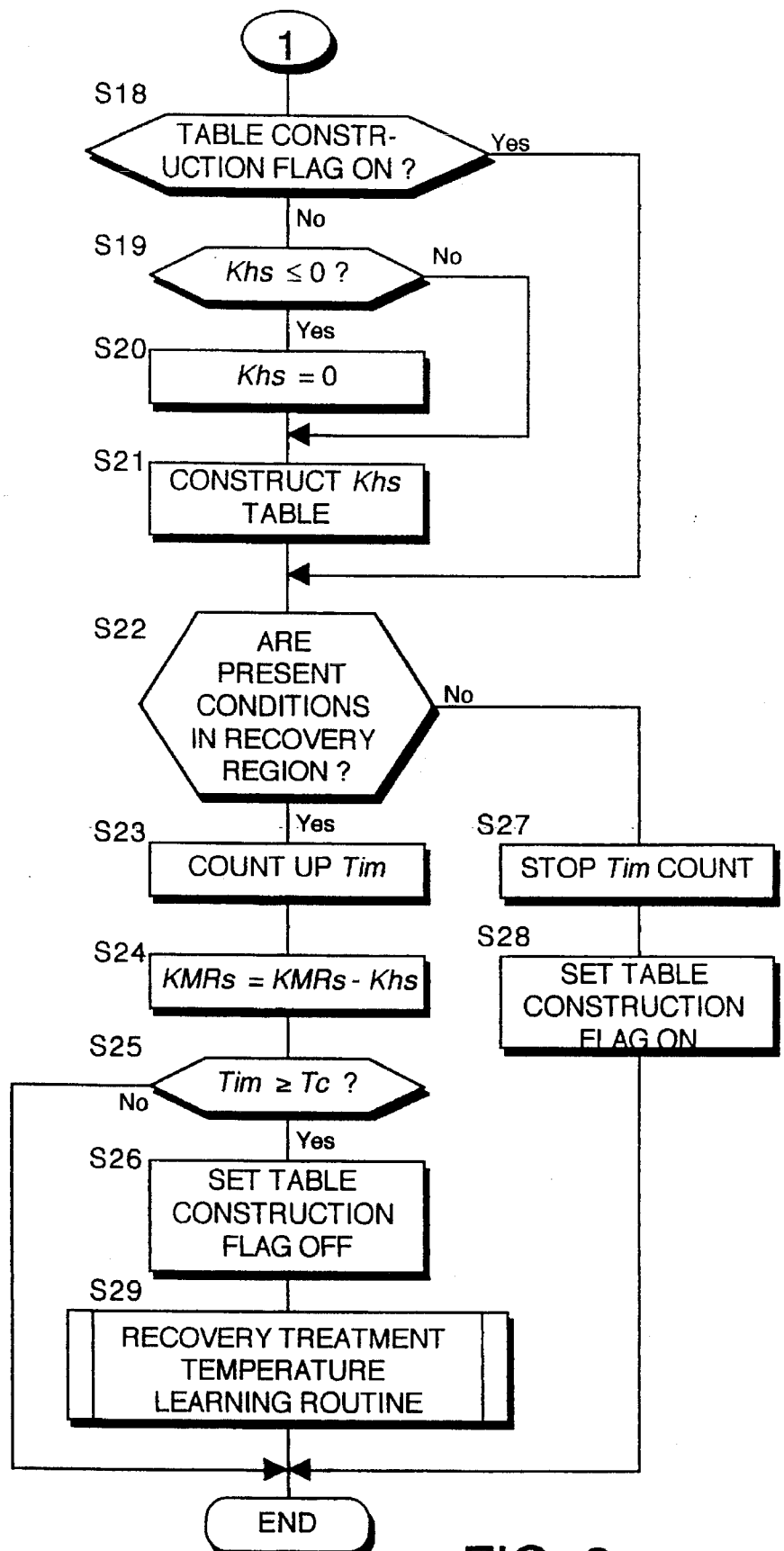
FIG. 8 is a flowchart showing the remainder of the oxidation recovery process.
Figure 14:
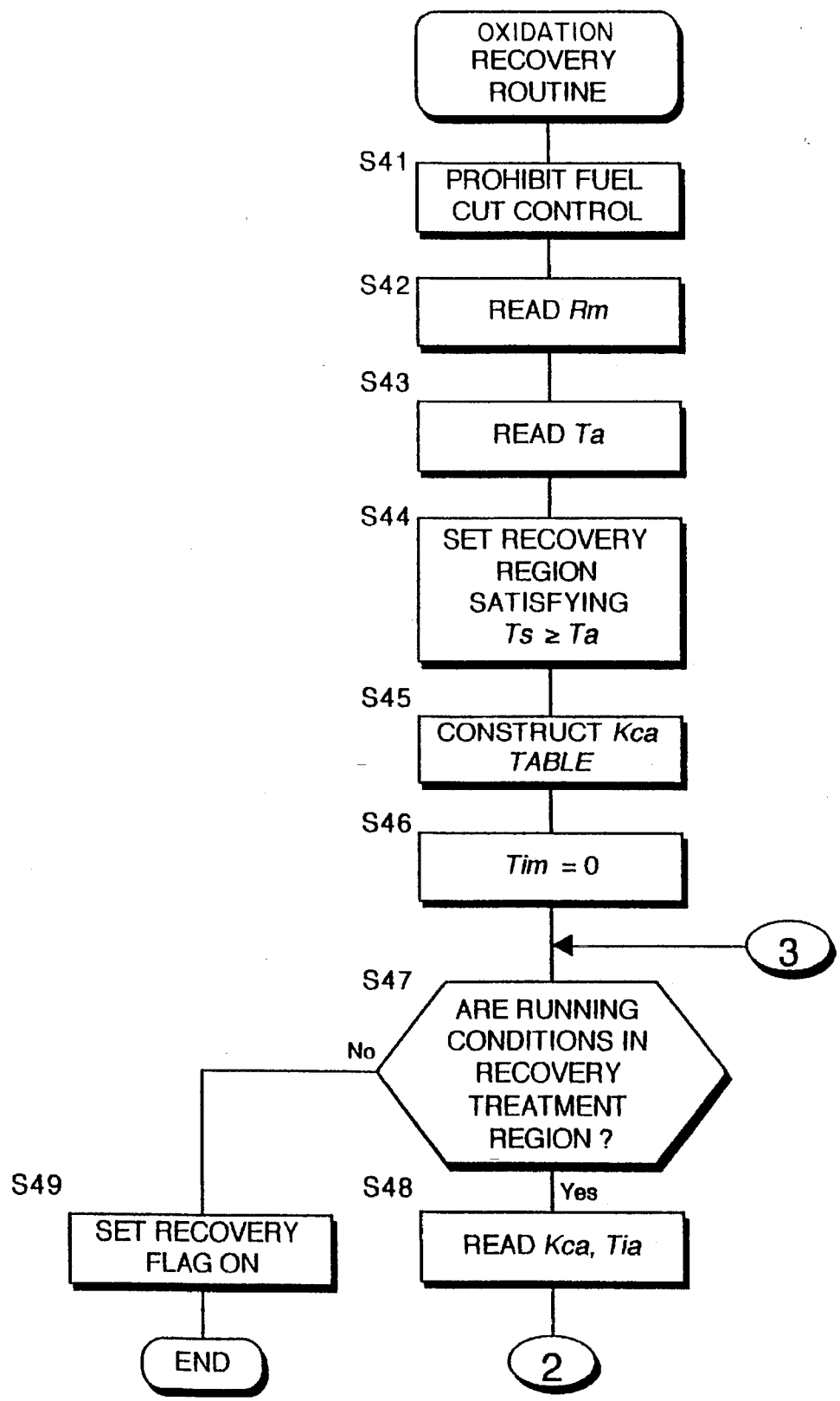
FIG. 14 is a flowchart showing an oxidation recovery process according to a second embodiment of this invention.
Figure 15:
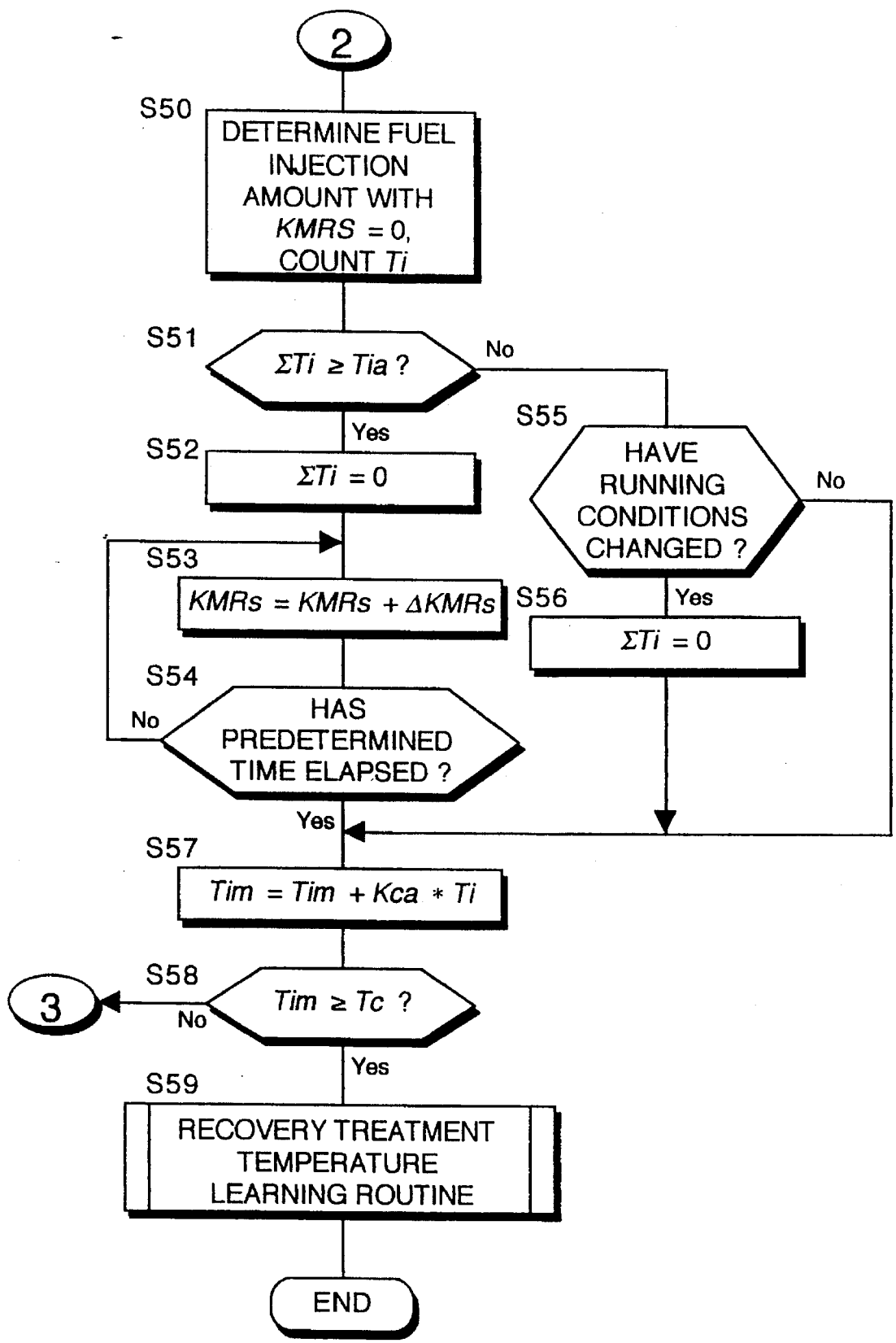
FIG. 15 is a flowchart showing the remainder of the oxidation recovery process of FIG. 14.

Steps S41–S44 in the flowchart of FIG. 14 are the same as steps S11–S14 in FIG. 7.

In step S45, weighting coefficients Kca corresponding to the recovery region are computed as shown in FIG. 16. As the catalyst recovery rate is largely influenced by the exhaust temperature, the weighting coefficient Kca is determined according to the catalyst recovery rate. The weighting coefficient Kca is a ratio of recovery rates when recovery is performed at the treatment temperature Ta and the aforesaid first reference exhaust temperature Ts. This means that performing recovery treatment for Ti seconds at the first reference exhaust temperature Ts is the same as performing recovery treatment for Kca*Ti seconds at the treatment temperature Ta.

Next, the total time Tim is set equal to 0 in step S46. In step S47, it is determined, from the table in FIG. 9, whether or not the present engine running conditions correspond to the recovery treatment region.

When it is determined that the present running conditions are within the recovery treatment region, the program proceeds to step S48, and the weighting coefficient Kca assigned for the engine speed N and basic fuel injection amount Tp is read based on the table in FIG. 16. An allowable running time Tia assigned for the engine speed N and the basic fuel injection amount Tp is also read based on the table in FIG. 17. The allowable running time Tia specifies the time for which the engine can run continuously at the stoichiometric air-fuel ratio under high load, and is preset based on the exhaust temperature and heat resistance characteristics of the engine 7.

When it is determined, in step S47, that the present running conditions are out of the recovery treatment region, the program sets the recovery flag ON in step S49 and returns to the routine of FIG. 4 for repeating the whole process from the start.

In step S50, the air-fuel ratio of the air-fuel mixture supplied to the engine 7 is set equal to the correction coefficient KMRs=0, and the fuel injection amount is determined. In other words, at this stage, open control to a rich air-fuel ratio is not performed, and the air-fuel ratio is controlled to the stoichiometric air-fuel ratio. Hence, by controlling the air-fuel ratio to the stoichiometric air-fuel ratio under a predetermined high load, the catalyst can be efficiently made to recover from temporary deterioration without decreasing exhaust temperature. At the same time, the counting of the interval time Ti for determining of fuel injection amount begins.

In order to prevent the continuous control time from exceeding the aforesaid allowable running time, the program proceeds to step S51 where it is determined whether or not the accumulated interval time ΣTi is equal to or greater than the permitted running time Tia.

If it is determined that ΣTi≧Tia, the program proceeds to step S52 where ΣTi is set to zero. Then, in step S53, the correction coefficient KMRs is returned, in steps of a predetermined value ΔKMRs, to a value obtained in a same manner as in step S16 of the first embodiment. This control is performed until step S54, where it is determined that the predetermined time for the exhaust temperature to return to normal temperature has elapsed.

If on the other hand, it is determined that ΣTi<Tia, the program proceeds to step S55, and if it is determined that the running conditions have changed, ΣTi is set to zero in step S56.

In a step S57, a total value Tim of the cumulative time is computed from:

$$Tim=Tim+Kca*Ti$$

The total value Tim that reflects a recovery rate which varies with the exhaust temperature according to the weighting coefficient Kca, may thus be computed.

The program proceeds to step S58. If it is determined that the total value Tim of the computed, weighted cumulative recovery time exceeds a predetermined value Tc, the program proceeds to step S59, and after the program shifts to the recovery treatment temperature learning routine of FIG. 12 described in the first embodiment hereinabove, the recovery treatment is terminated.

A third embodiment of this invention concerning the oxidation recovery routine will now be described with reference to FIGS. 18–21.

According to this embodiment, a different recovery treatment region from those of the aforesaid first and second embodiments is set. In other words, a recovery air-fuel ratio is set that is richer than the stoichiometric air-fuel ratio, and that gives the highest exhaust temperature allowable in view of the heat resistance characteristics of the catalyst, etc.

In this embodiment, therefore, a target exhaust temperature Trr corresponding to the exhaust temperature at this air-fuel ratio, is set.

Treatment recovery is then performed only within a range for which this target exhaust temperature Trr exceeds the recovery treatment temperature Ta. The total time of recovery treatment is also controlled such that a predetermined degree of recovery is achieved.

Figure 18:
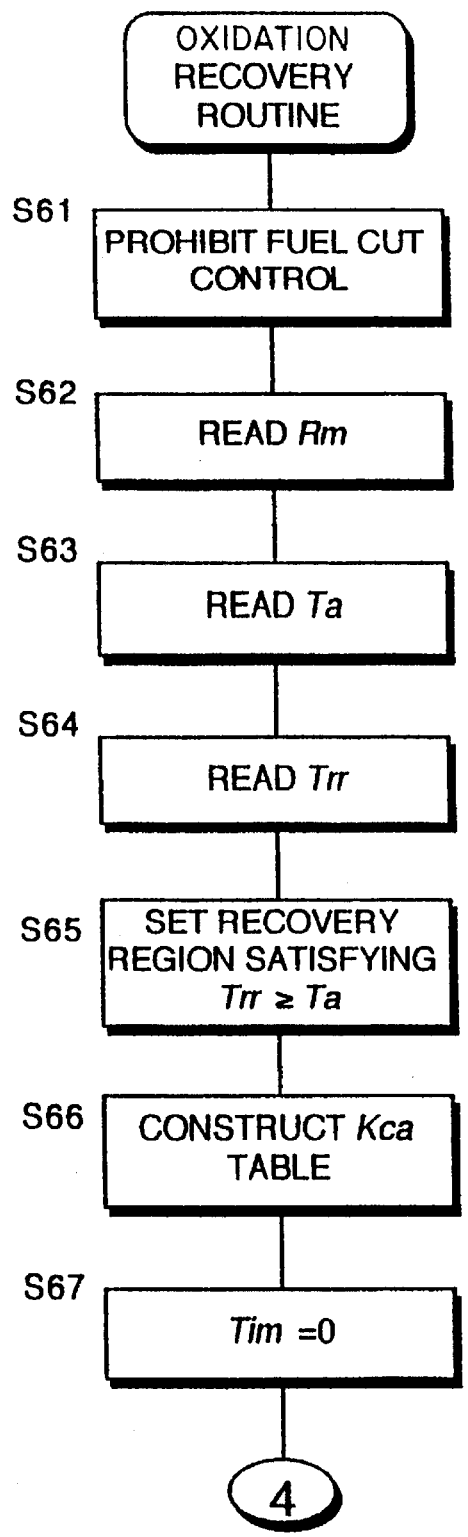
FIG. 18 is a flowchart showing an oxidation recovery process according to a third embodiment of this invention.
Figure 19:
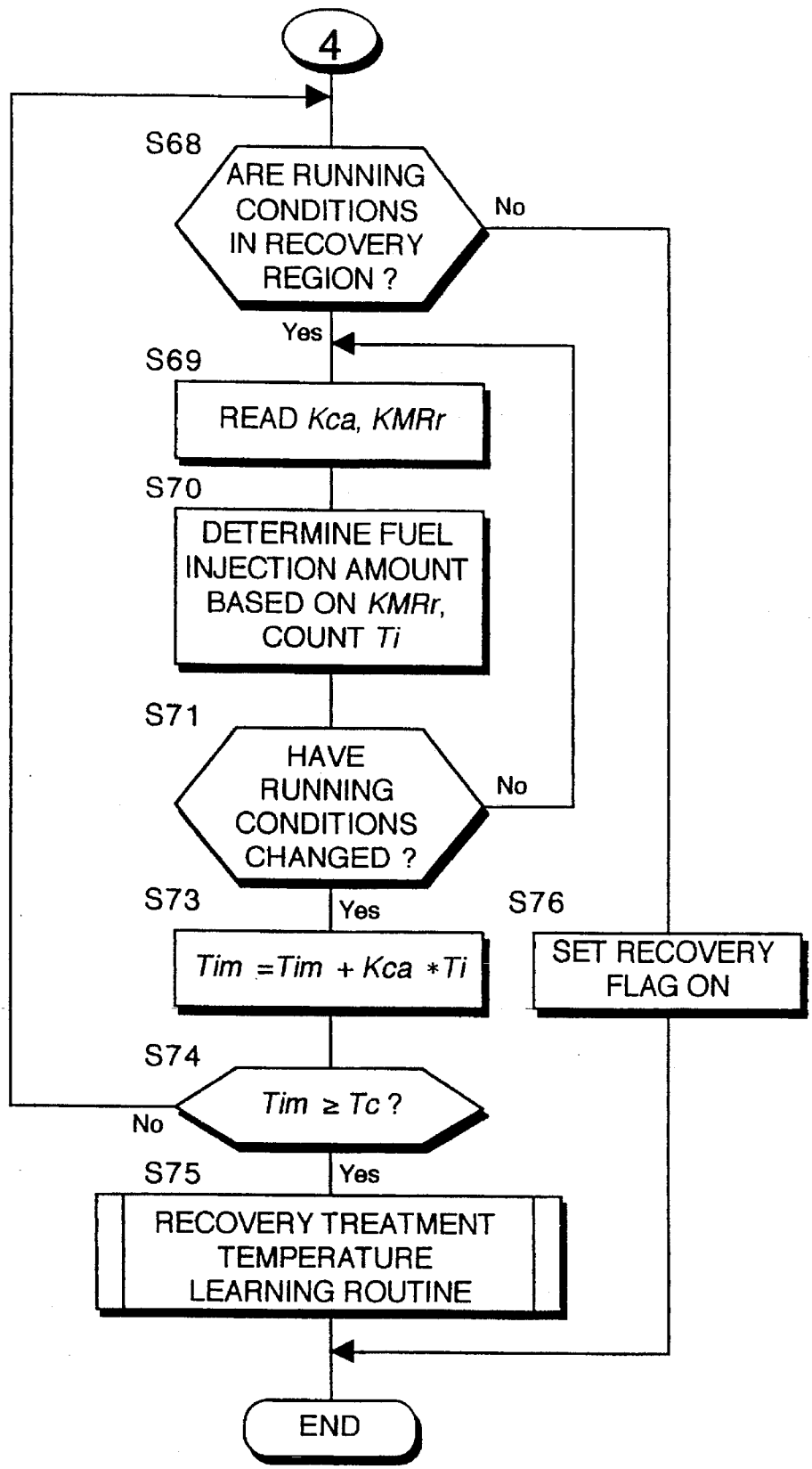
FIG. 19 is a flowchart showing the remainder of the oxidation recovery process of FIG. 18.

Steps S61–S63 of FIG. 18 are the same as steps S11–S13 of FIG. 7.

In step S64, the target exhaust temperature Trr is searched from a preset table. In a step S65, a recovery treatment region is set such that Trr≧Ta as shown in FIG. 20.

The program proceeds to a step S66, and a table of weighting coefficients Kca assigned for the engine speed N and basic fuel injection amount Tp is generated. For this purpose, the same type of calculation is performed as for the generation of the table in FIG. 16 in the aforesaid second embodiment, however unlike the second embodiment, the recovery treatment temperature Ta and the target exhaust temperature Trr are compared.

This comparison gives the ratio of the recovery rate when treatment is performed at the temperature Ta, and the recovery rate when treatment is performed at the target temperature Trr. This means that performing recovery treatment for Ti seconds at the target exhaust temperature Trr is the same as performing recovery treatment for Kca*Ti seconds at the temperature Ta.

Next, the program proceeds to step S67, and the accumulated value Tim is set equal to 0. In step S68, it is determined whether or not the present running conditions correspond to the recovery treatment range.

If it is determined that the present running conditions are out of the recovery treatment region, the program sets the recovery flag ON in step S76, returns to the routine of FIG. 4 and then repeats the whole process from the start.

If it is determined that the present running conditions are within the recovery treatment region, the program proceeds to step S69, and the weighting coefficient Kca assigned for the engine speed N and basic fuel injection amount Tp is read based on the table generated in step S66. Further, an air-fuel ratio correction coefficient KMRr assigned for the engine speed N and basic fuel injection amount Tp are read from a table in FIG. 21. The air-fuel ratio correction coefficient KMRr is a preset value for controlling the recovery treatment air-fuel ratio such that the exhaust temperature is increased as much as possible provided the air-fuel ratio is leaner than the air-fuel ratio correction coefficient KMRs, and taking the heat resistance of the catalyst, etc., into account.

In step S70, the fuel injection amount is determined using this correction coefficient KMRr. At the same time, counting of the interval time Ti for determining of fuel injection amount is begun.

In this way, by controlling the air-fuel ratio such that the exhaust temperature is increased as much as possible within a range permitted by the heat resistance of the catalyst, etc., recovery of temporary catalyst deterioration is performed efficiently.

In step S71, provided it is not determined that the running conditions have drifted to the non-deterioration recovery treatment region, the program proceeds to step S73, and a total value Tim of the cumulative time is computed as:

$$Tim=Tim+Kca*Tj$$

Subsequently, in step S74, if it is determined that this accumulated value Tim of the recovery treatment time exceeds a predetermined value Tc, the program shifts to a recovery treatment temperature learning routine in step S75, and recovery treatment is terminated.

In all of the aforesaid embodiments, after recovery treatment is complete, the engine returns to ordinary air-fuel ratio feedback control.

The embodiments of this invention in which an exclusive property or privilege is claimed are defined in the appended claims.

We claim:

1. An air-fuel ratio control system for an engine having a platinum catalyst purification system for an exhaust of said engine, said control system comprising:
    means for detecting a running condition of said engine;
    means for detecting a degree of oxidation ($R_m$) of said platinum catalyst;
    control means for setting a range of said running condition, for determining if said running condition is within said range, and for determining a recovery treatment air-fuel ratio in accordance with said degree of oxidation ($R_m$), said recovery treatment air-fuel ratio being equal to or richer than a stoichiometric air-fuel ratio; and
    means for providing a fuel mixture having said recovery treatment air-fuel ratio to said engine when said running condition is within said range.

2. An air-fuel ratio control system as defined in claim 1, wherein said control means sets a recovery treatment temperature (Ta) according to said degree of oxidation ($R_m$), and sets said range based on said recovery treatment temperature (Ta).

3. An air-fuel ratio control system as defined in claim 2, wherein said control means stores a first reference temperature (Ts) corresponding to an engine exhaust temperature for an air-fuel mixture having the stoichiometric air-fuel ratio, determines said running condition is within said range when said first reference temperature (Ts) exceeds said recovery treatment temperature (Ta), and calculates a recovery treatment air-fuel ratio which decreases said first reference temperature (Ts) to be equal to said recovery treatment temperature (Ta).

4. An air-fuel ratio control system as defined in claim 3, wherein said control means calculates a first air-fuel ratio correction coefficient (KMRs) based on said running condition, stores a second reference temperature (Tr) corresponding to an engine exhaust temperature for an air-fuel mixture having a rich air-fuel ratio, computes a second air-fuel ratio correction coefficient (Khs) which decreases said first reference temperature (Ts) to be equal to said recovery treatment temperature (Ta), computes said recovery treatment air-fuel ratio from said second air-fuel ratio correction coefficient (Khs), computes a total time (Tim) from when said providing means has started providing said fuel mixture having said recovery treatment air-fuel ratio, and instructs said providing means to stop providing said fuel mixture having said recovery treatment air-fuel ratio when said total time (Tim) exceeds a predetermined value (Tc).

5. An air-fuel ratio control system as defined in claim 2, wherein said recovery treatment air-fuel ratio is set to be equal to the stoichiometric air-fuel ratio and said control means stores a first reference temperature (Ts) corresponding to an engine exhaust temperature for a fuel mixture having the stoichiometric air-fuel ratio, determines said running condition is within said range when said first reference temperature (Ts) exceeds said recovery treatment temperature (Ta), computes a ratio (Kca) of a recovery rate when recovery is performed at said first reference temperature (Ts) to a recovery rate when recovery is performed at said recovery treatment temperature (Ta), computes an accumulated value (Tim) based on said ratio (Kca), and instructs said providing means to stop providing said fuel mixture having said recovery treatment air-fuel ratio when said accumulated value (Tim) exceeds a predetermined value (Tc).

6. An air-fuel ratio control system as defined in claim 2, wherein said recovery treatment air-fuel ratio is set to a value richer than the stoichiometric air-fuel ratio and said control means stores a target temperature (Trr) corresponding to an engine exhaust temperature for a fuel mixture having said recovery treatment air-fuel ratio, determines said running condition is within said range when said target temperature (Trr) exceeds said recovery treatment temperature (Ta), computes a ratio (Kca) of a recovery rate when recovery is performed at said target temperature (Trr) to a recovery rate when recovery is performed at said recovery treatment temperature (Ta), computes an accumulated value (Tim) based on said ratio (Kca), and instructs said providing means to stop providing said fuel mixture having said recovery treatment air-fuel ratio when said accumulated value (Tim) exceeds a predetermined value (Tc).

7. An air-fuel ratio control system as defined in claim 2, wherein said control means learns and corrects said recovery treatment temperature (Ta) corresponding to said degree of oxidation ($R_m$) immediately after said providing means has stopped providing said fuel mixture having said recovery treatment air-fuel ratio.

8. An air-fuel control system as defined in claim 1, wherein said running condition includes an engine running speed (N) and a basic fuel injection amount (Tp) determined according to an engine air intake volume.

9. An air-fuel ratio control system as defined in claim 1, wherein said control means prohibits stoppage of fuel supply during application of said recovery treatment air-fuel ratio even when said engine is decelerating.

10. A purification system for an exhaust of an engine, said system comprising:
    a sensor which detects a running condition of said engine;

a platinum catalyst unit connected to the exhaust of said engine;

a first oxygen sensor connected to the exhaust of said engine upstream of said platinum catalyst, said first sensor detecting a first oxygen level in the exhaust of said engine upstream of said platinum catalyst;

a second oxygen sensor connected to the exhaust of said engine downstream of said platinum catalyst, said second sensor detecting a second oxygen level in the exhaust of said engine downstream of said platinum catalyst; and a controller for setting a range of said running condition, for determining if said running condition is within said range, for deriving a degree of oxidation ($R_m$) of said platinum catalyst from said first and second oxygen levels, and for determining a recovery treatment air-fuel ratio in accordance with said degree of oxidation ($R_m$), said recovery treatment air-fuel ratio being equal to or richer than a stoichiometric air-fuel ratio.

11. A vehicle comprising:

an engine;

a platinum catalyst unit connected to an exhaust of said engine;

a sensor which detects a running condition of said engine;

a first oxygen sensor connected to the exhaust of said engine upstream of said platinum catalyst, said first sensor detecting a first oxygen level in the exhaust of said engine upstream of said platinum catalyst;

a second oxygen sensor connected to the exhaust of said engine downstream of said platinum catalyst, said second sensor detecting a second oxygen level in the exhaust of said engine downstream of said platinum catalyst; and a controller for setting a range of said running condition, for determining if said running condition is within said range, for deriving a degree of oxidation ($R_m$) of said platinum catalyst from said first and second oxygen levels, and for determining a recovery treatment air-fuel ratio in accordance with said degree of oxidation ($R_m$), said recovery treatment air-fuel ratio being equal to or richer than a stoichiometric air-fuel ratio.

* * * * *